Nov. 10, 1970   F. T. BUCKLEY ET AL   3,539,442
LAMINATED ARTICLES COMPRISING POLYCARBONATE SHEET BONDED
TO LAYER OF PLASTICIZED POLYVINYL ACETAL
Filed Dec. 15, 1967
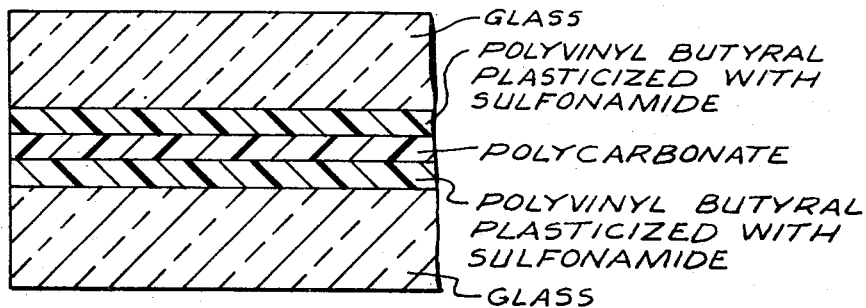
INVENTORS
FRANCIS T. BUCKLEY
RAYMOND F. RIEK
BY William J. Farrington
ATTORNEY United States Patent Office 3,539,442
Patented Nov. 10, 1970

3,539,442
LAMINATED ARTICLES COMPRISING POLYCARBONATE SHEET BONDED TO LAYER OF PLASTICIZED POLYVINYL ACETAL
Francis T. Buckley, Hampden, and Raymond F. Riek, Wilbraham, Mass., assignors to Monsanto Company, St. Louis, Mo., a corporation of Delaware
Filed Dec. 15, 1967, Ser. No. 690,740
Int. Cl. B32b 17/10, 31/04; C03c 27/12
U.S. Cl. 161—183
10 Claims

ABSTRACT OF THE DISCLOSURE

Disclosed herein are laminated structures comprising at least one sheet of plasticized polyvinyl acetal laminated to at least one sheet of polycarbonate, wherein the polyvinyl acetal is plasticized with a sulfonamide plasticizer.

BACKGROUND OF THE INVENTION

Field of the invention

This invention relates to a laminated article. More particularly, this invention relates to the lamination of a sheet of polycarbonate and a sheet of polyvinyl acetal which is plasticized with a sulfonamide plasticizer.

Description of the prior art

Recently it has been found that where rigid pellucid panels such as glass and polycarbonate are laminated together with an interlayer of polyvinyl acetal, a strong lamination results which has high impact strength. However, the conventional plasticizers for polyvinyl acetal which are used to prepare the laminate are highly unsatisfactory for the preparation of polyvinyl acetal/polycarbonate/polyvinyl acetal laminates which are subsequently sandwiched between the glass or other pellucid panels. Conventional plasticizers for the polyvinyl acetal cause degradation of the polycarbonate so that the laminated product becomes hazy or crazed in a very short time.

Furthermore, it is not practical to make safety glass by bonding polycarbonate directly to glass because polycarbonate and glass have different coefficients of thermal expansion. A safety glass made by bonding polycarbonate directly to glass will crack and spall the glass on cooling from the temperature necessary to bond the two together due to different amounts of contraction, thereby necessitating the use of an interlayer.

Thus, there exists in the art a need to solve the problem of preparing a polyvinyl acetal/polycarbonate/polyvinyl acetal laminate with good optical clarity which is free from objectionable haze or crazing.

SUMMARY OF THE INVENTION

It is therefore an object of this invention to provide a laminated article based on a polycarbonate and sulfonamide plasticized polyvinyl acetal.

Still a further object of this invention is to provide a sulfonamide plasticized polyvinyl acetal which can be used to laminate pellucid panels to polycarbonate without the difficulties experienced with conventional plasticized polyvinyl acetals.

Still a further object of this invention is to provide a laminated article of polycarbonate and glass which has good light transmission and good strength properties over a wide temperature range.

The foregoing objects and others are accomplished in accordance with this invention, generally speaking, by providing a laminated article comprising a polycarbonate and a polyvinyl acetal plasticized with a sulfonamide. Laminates comprising a polycarbonate bonded to glass or other pellucid panels with a sulfonamide plasticized polyvinyl acetal interlayer and precursor laminates adapted to prepare such a laminated article are provided in the present invention in order to solve the above mentioned problems associated with polyvinyl acetal/polycarbonate laminates.

Therefore, this invention provides, as a preferred embodiment a laminated article comprising polycarbonate and polyvinyl acetal, said polyvinyl acetal being plasticized with from about 5 to about 60 parts of a sulfonamide plasticizer per hundred parts of resin and more preferably, from 10 to 50 parts per hundred parts of resin of a sulfonamide plasticizer. The laminated article of the present invention is made up of two sheets: one of polyvinyl acetal plasticized with sulfonamide and one of polycarbonate. More preferably, the laminated article of the present invention is made up of one sheet of polycarbonate sandwiched between two sheets of sulfonamide plasticized polyvinyl acetal. This three ply laminate which is also referred to as a prelaminate for the purposes of the present invention, is in and of itself new and useful and may be used either immediately or at a much later time as an interlayer between pellucid panels to prepare a multiple ply laminate having more than three plies. The polyvinyl acetal/polycarbonate/polyvinyl acetal prelaminate in particular has the advantage of being prepared at one location by specialists in the thermoplastics field for use by laminators subsequently at another location wherein the three ply laminate forms the core between two pellucid panels. In addition to the foregoing economic and practical desirability for making the three ply laminate, there is an unexpected technical advantage also. The three ply laminate is much easier to adhere to pellucid panels because the polycarbonate cannot take up moisture after being sandwiched between the sheets of polyvinyl acetal. The process steps desirable for adhering polyvinyl acetals to polycarbonates are not always satisfactory for adhering polyvinyl acetals to pellucid panels. By making the above described three ply laminate one overcomes these difficulties.

The single figure of the drawing illustrates an embodiment of applicants' invention, which is directed to a five-layered laminated glass article.

It is well known to laminate glass with various plastics including plasticized polyvinyl acetals. However, the conventionally plasticized polyvinyl acetals, for example, polyvinyl butyral containing triethylene glycol di-(2-ethyl butyrate) is unsatisfactory for laminating glass to polycarbonate. The laminated structure based on the conventional plasticized polyvinyl butyral develops stress cracks in the polycarbonate in a short time and soon the amount of light transmission through the laminated article drops below permissible levels. When the sulfonamide is employed preferably in an amount of from about 5 to 60 and more preferably from 10 to 50 parts per hundred parts of the polyvinyl butyral then the adhesion of glass to the polycarbonate is satisfactory and yet there is no stress cracking or cloudiness developed in the product. The polyvinyl acetal sheet preferably has a thickness of from about 2 to about 60 mils, most preferably about 15 to 45 mils.

Any suitable sulfonamide may be used. The most suitable sulfonamides are those which are highly compatible with the polyvinyl acetal and which have little or no adverse effects on the polycarbonate.

Examples of these sulfonamide plasticizers include the following: N-ethyl o-toluene sulfonamide, N-ethyl p-toluene sulfonamide, N-ethyl o- and p- toluene sulfonamide, o- and p-toluene sulfonamide, p-toluene sulfonamide, N-ethyl benzene sulfonamide, N-butyl benzene sulfonamide, N-isopropyl benzene sulfonamide, mixed N-isopropyl benzene sulfonamide and N-isopropyl toluene sulfonamide; N-methyl benzene sulfonamide, N-n-propyl benzene sulfonamide, N-allyl benzene sulfonamide, N-sec-heptyl benzene sulfonamide, N,N-dimethyl benzene sulfonamide, N,N-diethyl benzene sulfonamide, N,N-di-n-butyl benzene sulfonamide, N-cyclohexyl benzene sulfonamide, N - cyclohexyl-3,4-dichlorobenzenesulfonamide, N-allyl p-toluene sulfonamide, N-β-hydroxyethyl p-toluene sulfonamide, N-n-butyl p-toluene sulfonamide, N-butyl glycollyl p-toluene sulfonamide, N-N-di-β-hydroxyethyl p-toluene sulfonamide, N,N-di-n-butyl p-toluene sulfonamide, N-cyclohexyl p-toluene sulfonamide, N-methyl xylene sulfonamide, N-cyclohexyl diphenyl sulfonamide, N,N-di-n-butyl phenylene disulfonamide. Also included are mixtures of the foregoing.

The preferred sulfonamide plasticizers are those corresponding to the following formula

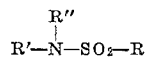

wherein R is a radical selected from the group consisting or aryl and alkaryl radicals of from 6 to 24 carbon atoms, such as phenyl, cresyl, tolyl, ortho tolyl, metatolyl, m-cumenyl, mesityl, 2,3-xylyl, and the like. The preferred alkaryl radicals are those which have one benzene ring and which contain from 1 to 4 carbon atoms per side chain and which have from 1 to 3 side chains. R' in the foregoing formula is selected from the group consisting of hydrogen, alkyl radicals of from 1 to 9 carbon atoms including cycloalkyl radicals such as cyclohexyl and the like, and aryl radicals of from 6 to 10 carbon atoms. R" in the foregoing formula is selected from the group consisting of hydrogen, alkyl radicals of from 1 to 9 carbon atoms including cycloalkyls and aryl and alkaryl radicals of from 6 to to 16 carbon atoms. Examples of these preferred plasticizers include N-ethyl o-toluene sulfonamide, N-ethyl p-toluene sulfonamide, N-ethyl o- and p-toluene sulfonamide, o- and p-toluene sulfonamide, p-toluene sulfonamide, N-ethyl benzene sulfonamide, N-butyl benzene sulfonamide, N-isopropyl benzene sulfonamide, mixed N-isopropyl benzene sulfonamide and N-isopropyl toluene sulfonamide.

Especially preferred is N-ethyl o- and p-toluene sulfonamide which is a mixture of N-ethyl o-toluene sulfonamide and N-ethyl p-toluene sulfonamide wherein the ratio of ortho to para components may vary from 99/1 to 1/99 parts by weight.

The polyvinyl acetal resins which are employed in the present invention may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Pat. Re. No. 20,430, dated June 29, 1937, and Lavin et al. U.S. Pat. No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde and mixtures thereof. Particularly preferred are polyvinyl acetal resins made from butyraldehyde.

In general the polyvinyl acetal resins employed have Staudinger molecular weights ranging from about 30,000 to 600,000 and preferably from about 120,000 to about 270,000 for polyvinyl butyrals and from about 25,000 to about 75,000 for polyvinyl formals.

In general, the polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyraldehyde acetal, the polyvinyl acetal resin will preferably contain, on a weight basis, from 8 to 22% hydroxyl groups, calculated as polyvinyl alcohol and more preferably from 10 to 20% hydroxyl groups, calculated as polyvinyl alcohol and from 0 to 10% acetate groups, calculated as polyvinyl acetate, the balance being substantially butyraldehyde acetal.

The laminated article of this invention takes advantage of the unusual mechanical properties of glass. Thus, in accordance with this invention the function of the polycarbonate is not purely structural. The function of the polycarbonate is to make the glass function as a structure bearing member even when shattered. Thus, the laminated article of this invention retains a large percentage of its load bearing properties even after the glass has been shattered so that a car body can be constructed where the front and rear windows serve as the sole supporting members for the roof. Such a car body dropped on its top will shatter the glass, but the load bearing properties of the laminated glass are retained sufficiently so that the roof is supported by this main load bearing column. Further illustrations of utility include windshields in aeronautical and space vehicles, loadbearing walls of buildings, partitions, and the like.

The polycarbonate may be any suitable film of polycarbonate such as that disclosed in U.S. Pats. 3,028,365 and 3,117,019 and is preferably prepared by reacting di-(monohydroxyaryl)-alkanes with derivatives of the carbonic acid such as phosgene and bischloro-carbonic acid esters of di-(monohydroxyaryl)-alkanes.

The aryl residues of the di-(monohydroxyaryl)-alkanes can be alike or different. The aryl residues can also carry substituents which are not capable of reacting in the conversion into polycarbonates, such as halogen atoms or alkyl groups, for example, the methyl, ethyl, propyl, or tert. butyl group. The alkyl residue of the di-(monohydroxyaryl)-alkanes linking the two benzene rings can be an open chain or a cycloaliphatic ring and may be substituted if desired, for example by an aryl residue.

Suitable di-(monohydroxyaryl)-alkanes are for example (4,4'-dihydroxy-diphenyl)-methane,
2,2-(4,4'-dihydroxy-diphenyl)-propane,
1,1-(4,4'-dihydroxy-diphenyl)-cyclohexane,
1,1-(4,4'-dihydroxy-3,3'-dimethyl-diphenyl)-cyclohexane,
1,1-(2,2'-dihydroxy-4,4'-dimethyl-diphenyl)-butane
  boiling point 185–188° C. under 0.5 mm. mercury
  gauge),
2,2-(2,2'-dihydroxy-4,4'-di-tert.-butyl-diphenyl)-propane
  or
1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane,
2,2-(4,4'-dihydroxy-diphenyl)-pentane (melting point
  149–150° C.),
3,3-(4,4'-dihydroxy-diphenyl)-pentane,
2,2-(4,4'-dihydroxy-diphenyl)-hexane,
3,3-(4,4'-dihydroxy-diphenyl)-hexane,
2,2-(4,4'-dihydroxy-diphenyl)-4-methyl-pentane (melting
  point 151–152° C.),
2,2-(4,4'-dihydroxy-diphenyl)-heptane (boiling point
  198–200° C. under 0.3 mm. mercury gauge), 4,4-(4,4'-dihydroxy-diphenyl)-heptane (melting point 148–149° C.), or
2,2-(4,4'-dihydroxy-diphenyl)-tridecane.

Suitable di-(monohydroxyaryl)-alkanes the two aryl residues of which are different are for example 2,2-(4,4'-dihydroxy-3'-methyl-diphenyl)-propane and
2,2-(4,4'-dihydroxy-3-methyl-3'-isopropyl-diphenyl)-butane.

Suitable di-(monohydroxyaryl)-alkanes the aryl residues of which carry halogen atoms are for instance 2,2-(3,5,3',5'-tetrachloro-4,4'-dihydroxy-diphenyl)-propane,
2,2-(3,5,3',5-tetrabromo-4,4'-dihydroxy-diphenyl)-propane,
(3,3'-dichloro-4,4'-dihydroxy-diphenyl)-methane and
2,2'-dihydroxy-5,5'-difluoro-diphenyl-methane.

Suitable di-(monohydroxyaryl)-alkanes the alkyl residue of which linking the two benzene rings is substituted by an aryl residue are for instance (4,4'-dihydroxy-diphenyl)-phenyl-methane and
1,1-(4,4'-dihydroxy-diphenyl)-1-phenyl-ethane.

In order to obtain special properties, mixtures of various di-(monohydroxyaryl)-alkanes can also be used, thus mixed polycarbonates are obtained.

The conversion of the aforesaid di-(monohydroxyaryl)-alkanes into high molecular polycarbonates by reacting with the mentioned derivatives of the carbonic acid may be carried out as known in the art. For instance, the di-(monohydroxyaryl)-alkanes can be re-esterified with carbonic acid diesters, e.g., dimethyl-, diethyl-, dipropyl-, dibutyl-, diamyl-, dioctyl-, dicyclohexyl-, diphenyl- and di-o,p-tolyl carbonate, at elevated temperatures from about 50 to about 320° C. and especially from about 120 to about 280° C.

The polycarbonates can also be produced by introducing phosgene into solutions of di-(monohydroxyaryl)-alkanes in organic bases, such as dimethylaniline, diethylaniline, trimethylamine and pyridine, or into solutions of di-(monohydroxylaryl)-alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di-(monohydroxyaryl)-alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of the phosgene.

Finally it is also possible to react the di-(monohydroxyaryl)-alkanes with about equimolecular amounts of bis-chloro carbonic acid esters of di-(monohydroxyaryl)-alkanes under corresponding conditions.

In the production of polycarbonates according to various processes it is advantageous to employ small amounts of reducing agents, for example sodium- or potassium-sulphide, -sulphite, and -dithionite or free phenol and p-tert.-butylphenol.

By adding monofunctional compounds which are capable of reacting with phosgene or with the end groups of the polycarbonates consisting of the chlorocarbonic acid ester group and which terminate the chains, such as the phenols for instance the phenol, the tert.-butylphenol, the cyclohexylphenol, and 2,2-(4-hydroxyphenol-4'-methoxyphenyl)-propane, further aniline and methylaniline, it is possible to regulate the molecular weight of the polycarbonates in wide limits.

The reaction of the di-(monohydroxyaryl)-alkanes with phosgene or of the chlorocarbonic esters of the di-(monohydroxyaryl)-alkanes may be carried out at room temperature or at lower or elevated temperatures, that is to say at temperatures from the freezing point to the boiling point of the mixture (column 1, line 31 to column 3, line 1 of 3,028,365). The polycarbonate film preferably has a thickness of from about 5 to 250 mils and most preferably from about 60 to about 100 mils. In some cases it may be desirable to use copolymers of various dihydroxy aryl propanes in order to achieve special properties.

Other pellucid materials are disclosed in U.S. Pat. 3,069,301 at column 1, lines 62–68, which are rigid and resistant to scratching and essentially non-hygroscopic.

In preparing the final preferred structural glass of this invention, the sheets are assembled one on top of the other with the polycarbonate in the center sandwiched by polyvinyl butyral sheets and glass sheets respectively and then the assembled laminate is subjected to heat and pressure sufficient to cause permanent adherence of one layer to the other. It is preferred to pre-dry the polycarbonate sheets prior to assembling the laminate. After assembly of the laminate, as mentioned above, it is preferred to warm the assembly. Desirably, the warm assembled laminate is passed through de-airing rolls to lightly adhere the layers together and expel the air. This can subsequently be passed through tacking rolls. The warm lightly adhered laminate is then preferably passed into an oil autoclave or other high pressure equipment and heated to a temperature of about 250 to 350° F. at a pressure of about 180 to about 250 p.s.i. for about 10 to 15 minutes. The oil is preferably allowed to reach temperature before any significant pressure is applied, but it is understood that the pressure is sufficient to hold the laminate together during the initial heat-up period in the autoclave. The assembly is allowed to cool to about 150° F. or lower while still under pressure and then the pressure is removed and the complete assembly is washed with water and detergent to remove the oil. Laminates prepared in this manner have exceptional load bearing properties and are suitable for structural or engineering purposes. It is preferred to use a pressure of about 200 p.s.i. and it is preferred to employ temperatures of about 300° F. in the preparation of the structural glass laminates.

The structural laminated glass of the invention is useful in many areas where it was impossible to use glass heretofore, for example, for the preparation of windshields for automobiles which eliminate the need for cornerposts by forming not only the windshield but also the supporting member for the roof of the automobile.

The invention is further illustrated by the following examples in which parts are by weight unless otherwise specified. Unless otherwise indicated, the polyvinyl acetal resin used throughout these examples is polyvinyl butyral resin having a moisture content of between 0.1 and 2.0% by weight and containing approximately 19% hydroxyl groups calculated as polyvinyl alcohol and approximately 1.2% acetate groups calculated as polyvinyl acetate, the balance being substantially butyral, average molecular weight between about 140,000 and about 200,000. About 100 parts of polyvinyl butyral are used with about 40 parts of a mixture of N-ethyl o- and p-toluene sulfonamide. A cake is prepared by mixing together the polyvinyl butyral and the N-ethyl o- and p-toluene sulfonamide to prepare a plasticized cake. The cake is skived to prepare a sheet of the stated thickness.

EXAMPLE 1

A sheet of plate glass about 12 x 12 inches having a thickness of about 125 mils is covered with a sheet of polyvinyl butyral containing the N-ethyl o- and p-toluene sulfonamide plasticizer about 12 x 12 inches and having a thickness of about 15 mils. A sheet of polyarylcarbonate having a thickness of about 90 mils which measures about 12 x 12 inches and which is prepared according to U.S. Pat. 3,117,019 from phosgene and 2,2-bis-(4-hydroxy phenyl)-propane having a relative viscosity of about 1.35 measured in methylene chloride at 25° C. is placed on top of the polyvinyl butyral. The sheet of polyarylcarbonate is pre-dried in an oven at 250° F. for four hours. Then another sheet of polyvinyl butyral and another sheet of glass and another sheet of polyvinyl butyral identical to the first two sheets are placed on the polycarbonate in the order named. The assembly is warmed to about 100° F. and then passed through de-airing rolls to lightly adhere the layers and expel air. It is then heated to about 160° F. and passed through tacking rolls. The assembly is then placed in an oil autoclave and heated to a temperature of about 275° F. and a pressure of about 200 p.s.i. for about 15 minutes. The temperature is reduced to about 150° F. and then the pressure is released. The glass is washed with detergent and water to remove the oil. A laminate so constructed when impacted with sufficient force to crack the glass does not delaminate and therefore retains its load supporting capacity.

EXAMPLE 2

The foregoing example is repeated except that the assembly is placed in the oil autoclave and first heated to about 300° F. over a period of about 30 minutes at a pressure barely sufficient to hold the first assembly together. A pressure of 200 lbs./in.$^2$ is then applied for about 10 minutes. The temperature is reduced to about 150° F. and the pressure is released. The resulting structure did not delaminate when the glass was cracked which illustrates the load bearing capacity of the structure.

EXAMPLE 3

Example 1 is repeated except that the plate glass is replaced with chemically tempered glass having a thickness of about 60 mils and sold under the trade name Chemcor by Corning Glass Works. The resulting structure did not delaminate when the glass was cracked which illustrates the load bearing capacity of the structure.

EXAMPLE 4

Example 1 is repeated except that instead of using a mixture of N-ethyl o- and p-toluene sulfonamide as the plasticizer for the polyvinyl butyral, N-ethyl benzene sulfonamide is used. Comparable results are obtained in that the laminate retained its load bearing properties after the glass is shattered.

EXAMPLE 5

Example 1 is repeated except that instead of using a mixture of N-ethyl o- and p-toluene sulfonamide as the plasticizer for the polyvinyl butyral, N-ethyl p-toluene sulfonamide is used. Comparable results are obtained in that the laminate retained its load bearing properties after the glass is shattered.

EXAMPLE 6

A pre-laminate is prepared by pressing a pre-dried sheet of the polyarylcarbonate of Example 1 between two sheets of 30 mil polyvinyl butyral plasticized with 30 parts of N-butyl-benzene sulfonamide. The pre-laminate is warmed slightly to about 100° F. and pressed together using slight pressure by passing it through rubber pinch rollers. The pre-laminate is then sandwiched between sheets of glass in accordance with the procedure of Example 1. This laminate exhibits load bearing properties similar to those obtained with the laminate of Example 1.

The following Examples 7 to 10 are set forth to illustrate the excellent adhesion of a 15 mil thick sulfonamide plasticized polyvinyl butyral film to a polycarbonate. In each case the polycarbonate sheet is the same type as used in Example 1 and the plasticizer used is a mixture of N-ethyl o- and p-toluene sulfonamide. The adhesion test samples are prepared by pressing a sheet of polyvinyl butyral resin to a pre-dried polycarbonate sheet. A sheet of aluminum foil is then pressed onto the polyvinyl butyral sheet and used as a backing member for the sheet during the peel tests. This pre-laminate assembly is pressed between two sheets of glass whose surfaces have been treated with a release agent to keep the glass from adhering to the pre-laminate. The resulting composite is then laminated according to the procedure of Example 1. The sample is then aged 48 hours and the glass sheets are peeled away from the aluminum foil layer. The aluminum foil/polyvinyl butyral/polycarbonate laminate is then cut into samples one and one-half (1½) inches wide. The aluminum backed polyvinyl butyral is then peeled from the polycarbonate sheet using and Instron tester at a cross head speed of 5 inches/minute. The peel strength values, which are reported in pounds/1½ inch width are tabulated in the following Table I.

TABLE I.—PEEL STRENGTH VALUES

| Example | Percent PVOH [1] | Percent acetate [2] | Amount of plasticizer [3] | Peel strength |
|---|---|---|---|---|
| 1 | 19 | 1.2 | 40 | 4.7 |
| 7 | 21.5 | 0.8 | 50 | 4.8 |
| 8 | 21.5 | 0.8 | 65 | 6.8 |
| 9 | 18.8 | 1.1 | 100 | 13.0 |
| 10 | 12.1 | 0.9 | 50 | 6.9 |

[1] Percent hydroxyl groups calculated as polyvinyl alcohol (PVOH).
[2] Percent acetate groups calculated as polyvinyl acetate.
[3] Parts of plasticizer per hundred parts of resin.

The peel strength values in the foregoing table illustrate that excellent adhesion of sulfonamide plasticized polyvinyl butyral to polycarbonate sheet is obtained over a wide range of percent hydroxyl groups in the resin as well as over a wide range of plasticizer levels.

EXAMPLE 11

Example 7 is repeated here except that a polyvinyl formal sheet is used in place of the polyvinyl butyral sheet used in Example 7. The polyvinyl formal has a hydroxyl content of about 6%, a residual acetate content of 13.8% and a molecular weight of about 40,000. The peel strengths for this laminate were comparable to those obtained in Example 7.

The following Examples 12 to 23 are set forth in order to illustrate the uniqueness of the sulfonamide plasticizers of the present invention in the preparation of glass/polyvinyl acetal/polycarbonate laminates. These sulfonamide plasticizers when used in the practice of this invention allow the preparation of five part laminates with good polyvinyl butyral to polycarbonate adhesion. The excellent results obtained with sulfonamide plasticizers is quite unexpected in that plasticizers which are normally used with polyvinyl acetals cause crazing or stress cracking of the polycarbonate sheet. This crazing or stress cracking phenomena was generally thought to preclude the preparation of the five part glass-polyvinyl acetal/polycarbonate laminates of the present invention.

In the following Examples 12 to 23 the general procedures of Example 1 are followed to prepare five part laminates using various well known plasticizers for polyvinyl acetals. The concentration of plasticizer in each example is 40 parts plasticizer per 100 parts of resin. After lamination the laminates are aged up to six months and examined visually for signs of crazing or stress cracking in the polycarbonate layer. The plasticizers used and the test results are tabulated in the following Table II.

TABLE II.—OPTICAL PROPERTIES OF LAMINATES USING VARIOUS NON-SULFONAMIDES

| Ex. | Plasticizer used | Optical properties of laminate |
|---|---|---|
| 1 | N-ethyl o- or p-toluene sulfomanide (control). | Excellent clarity. |
| 12 | Triethyleneglycol di-2-ethyl butyrate | Hazy, poor clarity. |
| 13 | Dipropylene glycol dibenzoate | Do. |
| 14 | Polyethyleneglycol monolaurate | Do. |
| 15 | Tributylcitrate | Do. |
| 16 | Dibutylcellosolve adipate | Do. |
| 17 | Dibutyl phthalate | Do. |
| 18 | Dibutyl sebacate | Do. |
| 19 | Butyl-benzyl phthalate | Do. |
| 20 | n-Octyl-n-decyl phthalate | Do. |
| 21 | Dihexyl phthalate | Do. |
| 22 | Butyl-cyclohexyl phthalate | Do. |
| 23 | Triethylene glycol dipelargonate | Do. |

In the foregoing Table II the haziness observed in the laminates of Examples 12 to 23 is believed to be due to the crazing or stress cracking of the polycarbonate sheet which is caused by the particular plasticizers which plasticizers are well known and widely accepted plasticizers for the polyvinyl acetals used. The data further illustrates the surprising and unexpected results obtained with the sulfonamide plasticizers of the present invention.

It is to be understood that the foregoing examples are for the purpose of illustration and that any other suitable polyvinyl acetal, polycarbonate or the like could be used provided that the teachings of this disclosure are followed. Likewise, other rigid pellucid panels may be used in place of glass. Examples of these would include sheets of methylmethacrylate, polycarbonate, polyvinyl chloride, polystyrene, cellulose acetate, cellulose butyrate, polyacrylonitrile, etc.

Although the invention has been described in considerable detail in the foregoing, it is to be understood that such detail is solely for the purpose of illustration and that many variations including laminations where more than one layer of polycarbonate, more than one layer of polyvinyl acetal, more than one layer of glass, etc., other means of forming a stable laminate such as bagging the assembly, evacuating and placing the bagged assembly in an autoclave, can be made by those skilled in the art without departing from the spirit and scope of the invention.

Also contemplated in the use of the laminates of the present invention is the use of conventional additives such as inks, dyes, pigments, antioxidants and other processing aids.

What is claimed is:

1. A laminated article comprising a sheet of polycarbonate and a sheet of polyvinyl acetal which has been plasticized with from 5 to 60 parts of a sulfonamide plasticizer per hundred parts of plasticized polyvinyl acetal sheet wherein the surface of the plasticized polyvinyl acetal sheet is in laminated contact with the polycarbonate sheet.

2. The laminated article of claim 1 wherein said polyvinyl acetal is a polyvinyl butyral.

3. The laminated article of claim 2 wherein the polyvinyl butyral has been plasticized with a sulfonamide having the formula $$R'-\underset{\underset{R''}{|}}{N}-SO_2-R$$

wherein R is a radical selected from the group consisting of aryl and alkaryl radicals of from 6 to 24 carbon atoms; R' is selected from the group consisting of hydrogen, alkyl radicals of from 1 to 9 carbon atoms and aryl radicals of from 6 to 10 carbon atoms; and wherein R" is selected from the group consisting of hydrogen, alkyl radicals of from 1 to 9 carbon atoms, aryl and alkaryl radicals of from 6 to 16 carbon atoms.

4. The laminated article of claim 3 wherein the sulfonamide plasticizer is a mixture of N-ethyl-o-sulfonamide and N-ethyl-p-sulfonamide.

5. The laminated article of claim 3 wherein the sulfonamide plasticizer is N-cyclohexyl p-toluene sulfonamide.

6. A five layer laminated glass article having high load bearing properties which comprises a sheet of polycarbonate, two sheets of polyvinyl butyral plasticized with a mixture of N-ethyl-o-sulfonamide and N-ethyl-p-sulfonamide in an amount of from about 10 to 50 parts of sulfonamide per hundred parts of polyvinyl butyral as essentially the sole plasticizer therefor and two sheets of glass, the flat surface of each sheet of polyvinyl butyral being adhesively bonded to said polycarbonate sheet and the other flat surface of said polyvinyl butyral being adhesively bonded to said glass sheet.

7. A five layer laminated glass article having high load bearing properties which comprises a sheet of polycarbonate, two sheets of polyvinyl butyral plasticized with from 5 to 60 parts of a sulfonamide plasticizer per hundred parts of polyvinyl butyral as essentially the sole plasticizer therefor and two sheets of glass, one flat surface of each sheet of polyvinyl butyral being adhesively bonded to said polycarbonate sheet and the other flat surface of said polyvinyl butyral being adhesively bonded to said glass sheet.

8. The laminated article of claim 7 wherein the polyvinyl butyral has been plasticized with a sulfonamide having the formula $$R'-\underset{\underset{R''}{|}}{N}-SO_2-R$$

wherein R is a radical selected from the group consisting of aryl and alkaryl radicals of from 6 to 24 carbon atoms; R' is selected from the group consisting of hydrogen, alkyl radicals of from 1 to 9 carbon atoms and aryl radicals of from 6 to 10 carbon atoms; and wherein R" is selected from the group consisting of hydrogen, alkyl radicals of from 1 to 9 carbon atoms, aryl and alkaryl radicals of from 6 to 16 carbon atoms.

9. The laminated article of claim 7 wherein the sulfonamide plasticizer is a mixture of N-ethyl-o-sulfonamide and N-ethyl-p-sulfonamide.

10. The laminated article of claim 7 wherein the sulfonamide plasticizer is N-cyclohexyl p-toluene sulfonamide.

References Cited

UNITED STATES PATENTS

| 3,458,388 | 7/1969 | Moynihan | 161—183 X |
| 3,468,749 | 9/1969 | Mattimoe et al. | 156—106 X |
| 3,437,552 | 4/1969 | Bowen | 156—106 X |
| 3,437,553 | 4/1969 | Hailstone | 156—106 X |
| 3,449,184 | 6/1969 | Balk | 156—106 X |
| 2,056,796 | 10/1936 | Macht et al. | 106—22 |
| 2,200,969 | 5/1940 | Ryan et al. | 161—199 |
| 2,464,826 | 3/1949 | Neher et al. | 161—199 X |
| 2,526,728 | 10/1950 | Burk et al. | 161—199 X |
| 3,178,334 | 4/1965 | Bragaw et al. | 161—199 X |
| 3,388,033 | 6/1968 | Buckley et al. | 161—199 X |
| 3,388,034 | 6/1968 | McCombie | 161—199 X |
| 3,406,086 | 10/1968 | Foster | 161—199 X |

HAROLD ANSHER, Primary Examiner

U.S. Cl. X.R.

156—106, 309; 161—199